J. Q. & O. R. ADAMS.
Corn-Sheller.

No. 210,074.   Patented Nov. 19, 1878.

INVENTORS
John Q. Adams
AND
Oliver R. Adams.

Witnesses

3 Sheets—Sheet 2.

J. Q. & O. R. ADAMS.
Corn-Sheller.

No. 210,074.    Patented Nov. 19, 1878.

Witnesses

INVENTORS
John Q. Adams
AND
Oliver R. Adams
By
Attorneys

3 Sheets—Sheet 3.
J. Q. & O. R. ADAMS.
Corn-Sheller.
No. 210,074.  Patented Nov. 19, 1878.
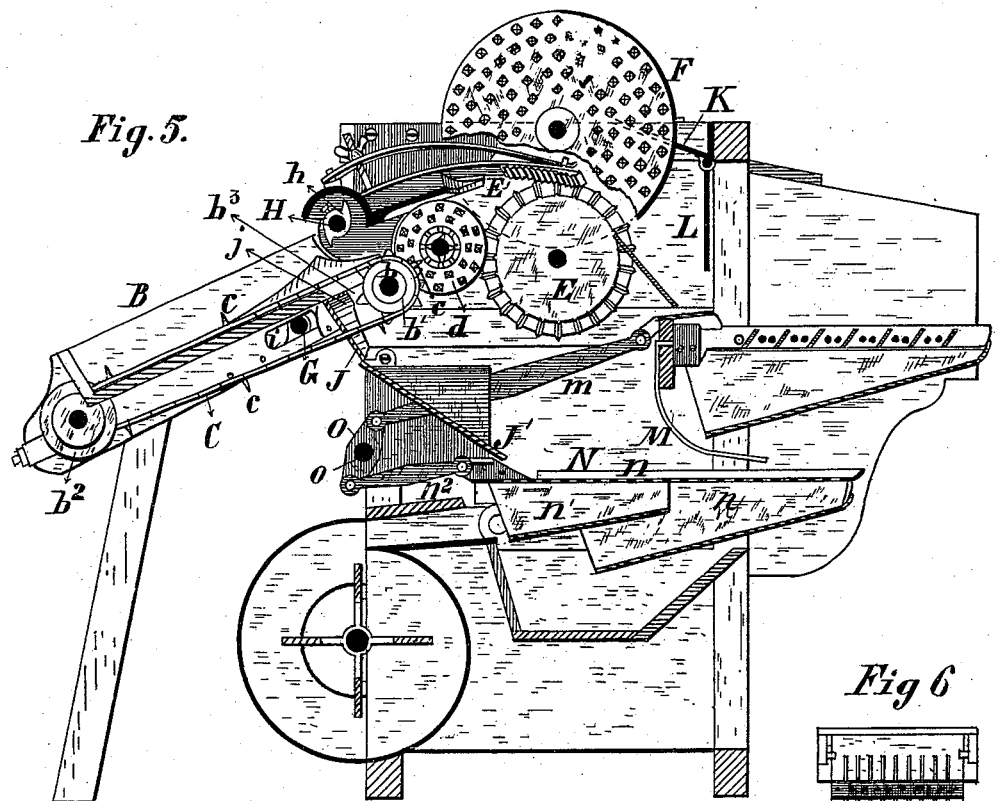
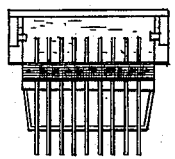
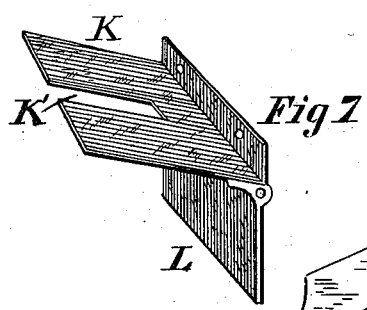
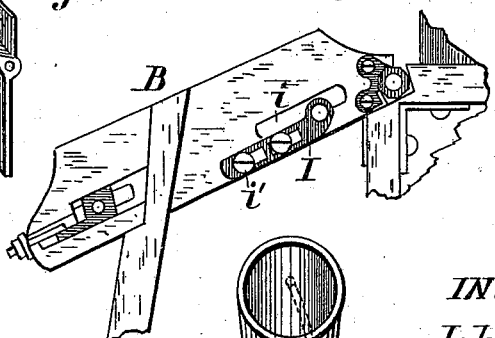
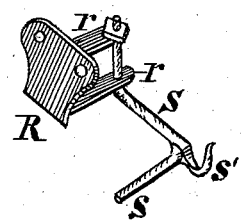
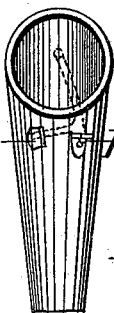
Witnesses
INVENTORS
John Q. Adams
AND
Oliver R. Adams
By Coburn & Thacher
Attorneys

UNITED STATES PATENT OFFICE.

JOHN Q. ADAMS AND OLIVER R. ADAMS, OF MARSEILLES, ILLINOIS.

IMPROVEMENT IN CORN-SHELLERS.

Specification forming part of Letters Patent No. 210,074, dated November 19, 1878; application filed April 17, 1878.

*To all whom it may concern:*

Be it known that we, JOHN QUINCY ADAMS and OLIVER R. ADAMS, of Marseilles, in the county of La Salle and State of Illinois, have invented a new and useful Improvement in Corn-Shellers, which is fully described in the following specification, reference being had to the accompanying drawings, in which—

Figure 1:
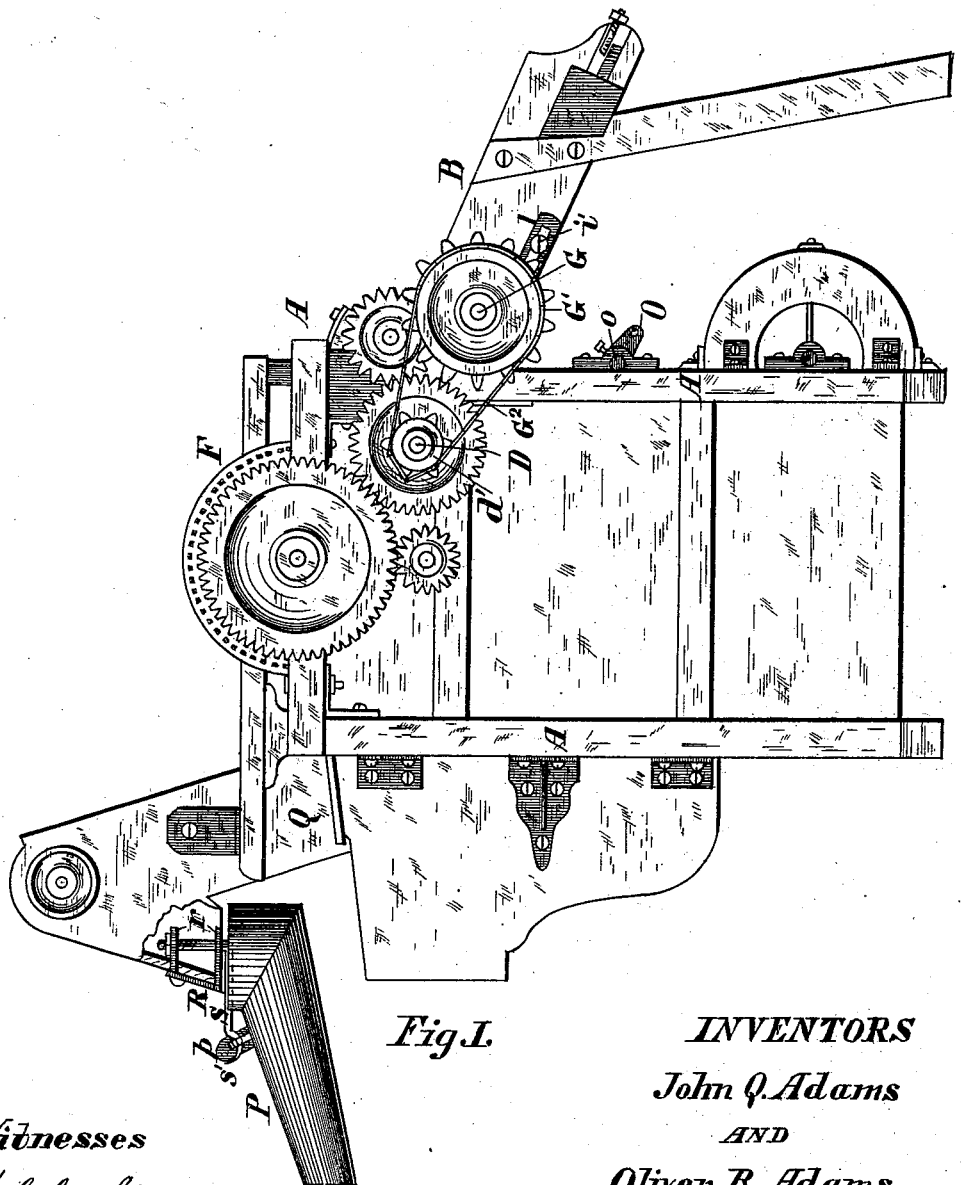
Figure 2:
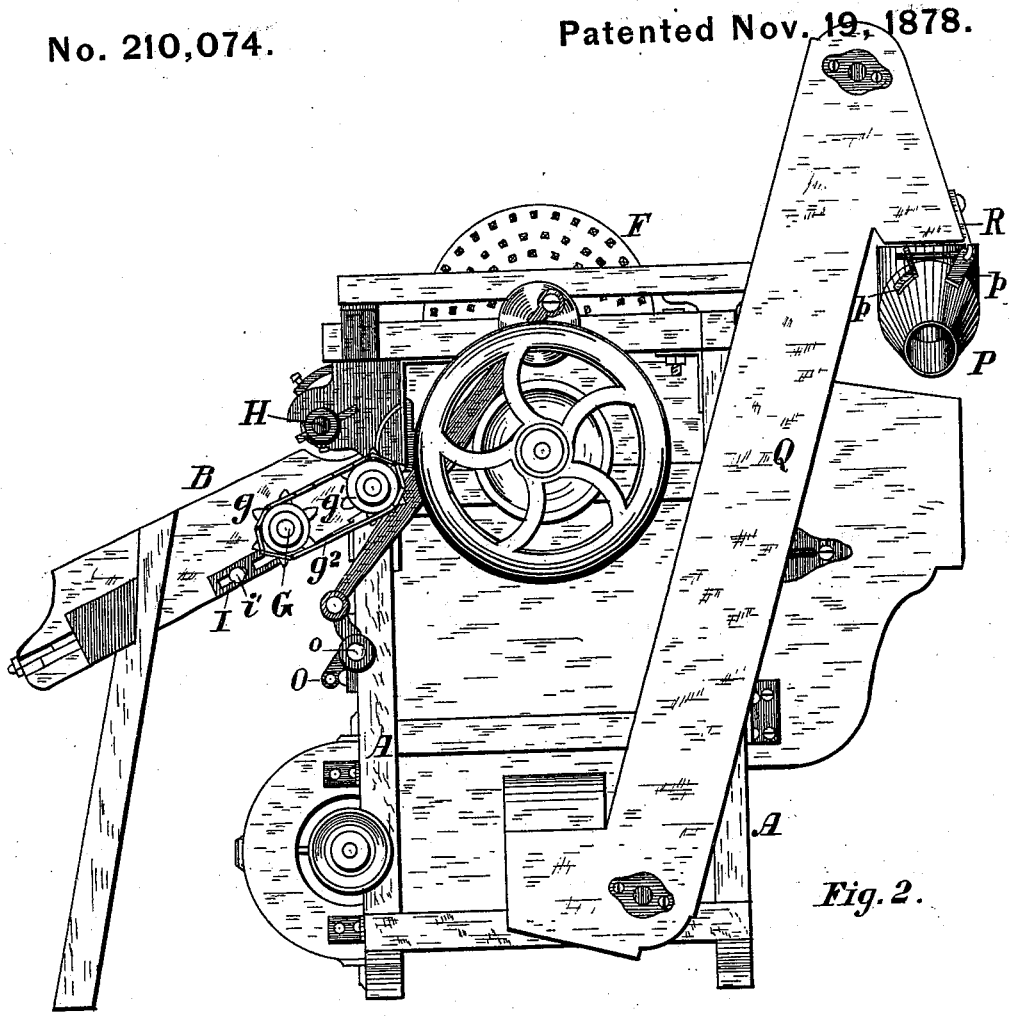
Figures 3, 4:
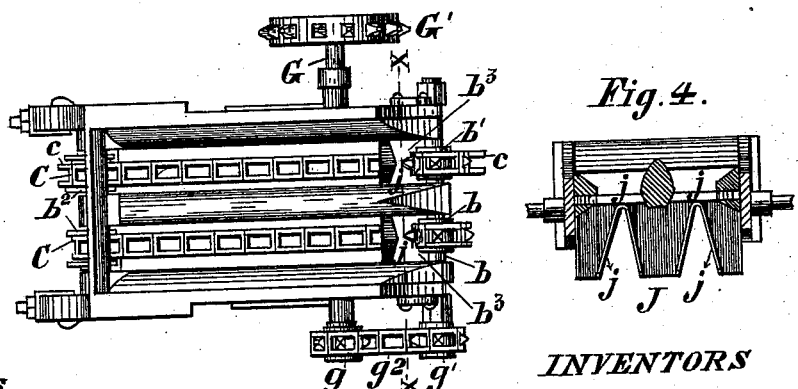

Figure 1 represents a side elevation of a corn-sheller embodying our improvements; Fig. 2, a similar view of the opposite side of the machine; Fig. 3, a plan view of the feed-elevator; Fig. 4, a cross-section of the same, taken on the line $x$ $x$, Fig. 3; Fig. 5, a longitudinal vertical section of the entire machine; Fig. 6, an end elevation of the cob-shoe; Fig. 7, a detached view of the cob-guard at the rear of the machine; Fig. 8, a side elevation of the feed-elevator, with sprocket-wheels removed; Fig. 9, a detached view of the spout-support, and Fig. 10 a plan view of the spout and its support.

Our invention relates to that class of corn-shellers in which the shelling-wheels are of a disk form and the corn is presented endwise, in contradistinction to shellers generally known as "cylinder-machines," in which the corn is fed in sidewise.

Our invention consists in elevator-chains provided with projections at suitable intervals and combined with driving mechanism, by which positive motion is given to the chains, so that they operate as a force-feeding device.

It also consists in the special arrangement of the elevator-chains in relation to the picker-wheels, whereby the corn is delivered directly from the chains upon the picker-wheel shaft.

It also consists in the arrangement of the feed-elevator and the shelling devices so that the path of the corn is upon substantially the same plane from the bottom of the elevator up to and entirely through the shelling devices.

It also consists in various devices and combinations of devices, all of which will be hereinafter more fully set forth.

The main features of this class of machines are well known, and therefore they will not be particularly described here, but only alluded to as may be necessary in describing the various improvements which we have made.

In the drawing, A represents the supporting frame-work of the machine, and B the inclined feed-elevator, which may be attached to the machine in any usual way.

The head roller $b$ at the upper end of the elevator is provided with sprocket-wheels $b^1$, one for each hole of the sheller. At the lower end of the elevator are plain sheaves $b^2$, mounted loosely on a shaft, and sprocket-chains C are run over these sheaves and the sprocket-wheels on the head roller. At suitable intervals links in these chains are provided with upright projections $c$, which carry the corn up, and also act as forcers to drive it into the shelling mechanism, as will be presently explained.

In rear of the head roller is the picker-wheel shaft D, carrying the usual picker-wheels $d$, and still farther on the bevel-runners E and the straight runners F, of usual form; but the shaft of the picker-wheel is arranged a little higher than the head roller, and the bevel and straight runners are also elevated, as shown in Fig. 5 of the drawings, so that the outer ends of projections on the picker-wheel shaft and the upper edge of the bevel-runners will lie in the same plane, or nearly so, as the inclined elevator.

This precise arrangement may be modified somewhat, but it should be substantially maintained, so that the corn will travel in a straight line, or nearly so, from the foot of the elevator until it leaves the shelling devices, being delivered in substantially the same inclined plane successively from the elevator-chains to the picker-wheels, and thence to the bevel-runners, over which are arranged the rag-irons E', which are also inclined to conform to the new arrangement of the devices above mentioned.

The head roller is arranged close up to the picker-wheels, and the sprocket-wheels extend in between the latter, so as to carry the chains close up to the picker-wheel shaft, and as near to the latter as possible, and permit the projections $c$ on the chains to clear the projections on the shaft.

It will thus be seen that the elevator-chains actually carry the corn in between the picker-wheels and deliver the ears directly upon the picker-wheel shaft; and if the chains are driven by positive mechanism, so as to prevent all slipping, they will operate, to a certain extent, as force-feeders to drive the corn into the shelling devices, on account of the projections thereon, which carry up and drive the ears forward.

To effect this result we mount a shaft, G, on the elevator a little in front of the head roller, on one end of which is a small sprocket-wheel, $g$, outside of the frame. A corresponding sprocket-wheel, $g^1$, is also attached to the end of the head roller on the same side of the machine and outside of the frame-work, and a chain, $g^2$, connects the two. On the other projecting end of the shaft G a large sprocket-wheel, $G^1$, is secured, and on the end of the picker-wheel shaft D, projecting on that side of the machine, is a small sprocket-wheel, $d'$, and a chain, $G^2$, connects the two.

It will thus be seen that motion will be communicated from the picker-wheel shaft to the counter-shaft G, and thence to the head roller, by devices which are positive and certain in their action, and will effectually prevent all slipping. Of course there is no slipping of the chains on their own sprocket-wheels, and hence they become devices for driving the corn forward into the sheller.

The machine will work with fair capacity with this feeding device alone; but we have found it advisable to use in connection therewith a beater-shaft, H, provided with wings or flanges, $h$, the same as is now in general use.

This beater-shaft we locate above and a little in front of the head roller, as shown in Fig. 5 of the drawings, and cause it to revolve with the feed by gearing to the picker-wheel shaft. The operation of this force-feed beater-shaft is well known, and, used in connection with the chain force-feed above described, it increases the capacity of the machine greatly and absolutely prevents all clogging.

The bearings I of the shaft G are made adjustable by means of slots $i$ therein and set-screws $i'$, so that the shaft may be adjusted laterally, the sides of the elevator being slotted to permit this, for the purpose of removing or adjusting the driving-chains $G^2$ $g^2$ whenever required.

The floor of the elevator B is cut away at the upper end so as to leave openings $b^3$ below the chains, just in front of their sprocket-wheels on the head roller. The shelled corn, more or less of which is usually mixed with the ears, will drop through these openings, thereby preventing interference with the running of the chains by being carried onto the sprocket-wheels, where the kernels are liable to become wedged between the chains and wheels to such an extent as to seriously interrupt the operation of the machine.

In order to save the corn which drops through these openings, a conductor, J, is attached to the under side of the elevator just back of the openings, which extends downward and inward, and is notched or forked to accommodate the lower chains, as shown in Fig. 4 of the drawings. Flanges $j$ upon the front of the conductor extend up to the central part of each opening, and serve as dividing-partitions, by means of which the corn is conducted to one side or the other of the chains below, which the flanges cover. The conductor directs the corn to the upper end of the incline $J'$, down which it passes to the screen.

In rear of the straight runner a guard, K, is arranged, in the end of which is a recess, $K'$, which receives the straight runner and permits the guard to be extended on each side of the latter, as shown in Fig. 7 of the drawings. This guard is attached to the upper part of the frame-work, and as it extends in rear of and forward on each side of the straight runner it prevents the cobs from flying out at the top of the machine as they leave the shelling mechanism. A flap, L, of sheet metal or other suitable material, is also hung in the opening just in rear of the shelling devices, being hinged at its upper edge to the main frame or the guard K, so as to swing freely. This flap does not extend down to the cob-shoe, and stops the kernels of corn flying out in rear of the straight runner, causing them all to fall upon the shoe below. As this flap is hinged and swings freely it will not interfere with the passage of the cobs to the rear of the machine.

A series of wires, M, are attached to the rear end of the cob-shoe, in its front end, and bent round underneath the latter, as shown in Fig. 5 of the drawings, their free ends projecting a little way under the pan, down which the corn passes to the screen. These wires are for the purpose of catching and retaining the silk, which, falling with the shelled corn upon the screen below, will sometimes become matted, so as to prevent the corn from passing through the latter. The silk caught by the wires will separate and hang from them, so that, although stopped, it will not hinder the corn from falling on the screen, and, when slipping off from the wires, will fall upon the screen near its extreme rear end.

The corn shoe or screen N is usually provided with a single pan, $n$, extending and inclining downward from the rear end to the front of the screen.

We provide a supplementary pan, $n^1$, at the rear end of the screen, extending forward into the pan $n$ a short distance, its bottom being arranged above the bottom of the latter, as shown in Fig. 5 of the drawings. The mass of corn falls upon that portion of the screen above the pan $n^1$, and the latter is employed to check the blast of air somewhat, and hold it under the mass of corn, where it is most needed. The extra pan is, of course, open at both ends, and is intended to operate simply to check the air-blast, but not to entirely stop it.

The cob and corn shoes are connected by rods $m$ and $n^2$ to double crank-arms O on the rock-shaft $o$. These connecting-rods, instead of being attached to the central portion of the shoes, as heretofore, are duplicated, and one rod attached to each corner, at the rear end of each shoe. An even and uniform impulse is thereby given to the shoes, so that there will be no twisting or binding of the latter in their movements. The connecting-rods should be adjustable in length, so as to regulate the throw of the shoes.

The grain-spout P is supported by a bracket, R, attached to the spout end of the grain-elevator Q. This bracket has lugs $r$, which project inward through a slit in the elevator-casing, and extend about to the center of the opening in the chute.

An angular arm, S, is pivoted in these lugs at their inner ends, and projects outward horizontally below the chute, being bent at its outer end to form an arm, $s$, and a hook, $s'$, to which the spout is attached by means of lugs $p$ thereon. These lugs are so arranged that the greater weight of the spout is back of them, so that with its rear end under the mouth of the elevator-chute, when left free, it will maintain a horizontal position. By turning up the spout it may be detached from the hook $s'$, and thus removed from its support.

The spout may be turned into position by the swinging of the arm S, which, being pivoted centrally in relation to the discharge-opening, always keeps the receiving end of the spout in the same relation thereto. At the same time the construction of the supporting device is such that it will not materially interfere with the discharge of the grain into the spout.

In the operation of our machine the feeding devices and the shelling mechanism being arranged as described above, it is evident that the direction of the ears of corn is not materially changed from the time they enter the feed-elevator until they leave the shelling devices, but that they travel along substantially the same inclined plane all the time. There will be, therefore, no irregularity in the feed occasioned by a change of direction, a tendency to which is always found in machines where the corn passes along different planes arranged at an angle to each other, the progress of the ears being either accelerated or retarded, according to the relative position of the planes.

In our machine the feed will be perfectly regular, and with the forcing-chains and forcing beater-shaft operating in conjunction, the corn is taken care of and driven into the shelling devices as fast as it can be crowded into the throat of the machine.

The construction of the feed-elevator devices with sprocket-wheels for the chains on the head roller and plain sheaves at the lower end of the elevator, prevents all buckling of the feed-chains, and gives them a regular and steady movement.

The function and operation of other features of our improvement have been set forth in connection with the description of their construction given above; but we do not limit ourselves to any special inclinations of the feed-elevator.

In the drawings a two-hole machine is shown; but it will be understood, of course, that our improvements are applicable to a machine with any number of holes.

Having thus described our invention, what we claim as new, and desire to secure by Letters Patent, is—

1. A corn-sheller in which the feeding devices are arranged in relation to each other, so that the path of the corn from the elevator to the shelling devices will be along an incline substantially a continuation of the plane of the inclined elevator, substantially as described.

2. The inclined feed-elevator B, in combination with the picker-wheel shaft and bevel-runners arranged in relation to the head roller of the elevator, so that the moving surfaces over which the corn passes after leaving the elevator are in substantially the same inclined plane as the latter, substantially as described.

3. In a corn-sheller, the shelling devices, in combination with an elevator and devices for forcing the feed to the shelling mechanism, all arranged and operating to provide a continuous path for the corn in substantially the same plane from the outer end of the elevator to and into the shelling devices.

4. The elevator-chains provided with projections $c$ at suitable intervals, in combination with sprocket-wheels on the head roller, mechanism for giving a positive motion to the roller, and shelling devices, whereby the chains are made to operate as a force-feeding device, substantially as described.

5. The picker-wheel shaft, in combination with sprocket-wheels on the head roller, over which the elevator-chains run, extending in between the picker-wheels, whereby the elevator-chains are carried in close to the shaft to deliver the corn directly upon the latter, substantially as described.

6. The head roller provided with sprocket-wheels, in combination with the counter-shaft G, carrying the sprocket-wheels $G^1$ $g^1$, the sprocket-wheel $d'$ on the picker-wheel shaft, the chains $G^2$ $g^2$, and the elevator-chains C, substantially as described.

7. The counter-shaft G, mounted in bearings adjustable longitudinally on the elevator, in combination with the sprocket-wheels and chains, whereby motion is communicated from the picker-wheel shaft to the head roller, substantially as described.

8. The head roller provided with sprocket-wheels for the elevator-chains, in combination with the force-feed beater-shaft H and the picker-wheel shaft, substantially as described.

9. A chain force-feeding device, in combination with a force-feed beater-shaft, substantially as described.

10. The elevator B, provided with apertures or openings $b^3$ in the floor thereof, just in front of the sprocket-wheels on the head roller, substantially as and for the purpose set forth.

11. The conductor J, arranged below the openings in the floor of the elevator, and extending into the interior of the sheller above the corn-shoe, substantially as and for the purpose set forth.

12. The conductor J, provided with separating-flanges $j$, in combination with the elevator, having apertures $b^3$ in its flooring, and the elevator-chains C, substantially as described.

13. The cob-guard K, provided with a slot, K', attached to the rear end of the sheller-frame, and arranged to cover the entire space in rear of the straight runner and for some distance at the sides of the latter, substantially as described.

14. The straight runner and bevel runners, in combination with a sheet, L, of flexible material, suspended by a hinge-joint at the rear end of the machine just back of the shelling-wheels, and free to swing back and forth, substantially as and for the purpose set forth.

15. The bent wires M, attached to the rear end of the cob-shoe, and arranged in relation thereto, substantially as and for the purpose set forth.

16. The cob-shoe $m$, in combination with the corn shoe or screen, and a device, arranged at the rear end of the cob-shoe and between the two, for catching and retaining the silk above and out of contact with the corn-shoe, substantially as described.

17. The bracket R, attached to the grain-elevator, in combination with the swinging arm S and the spout P, substantially as described.

18. A pivoted support for the grain-spout P, arranged centrally within the discharge-opening of the grain-elevator, substantially as described.

19. The feed-elevator provided with carrying and forcing chains, in combination with the picker-wheels, the force-feed beater-shaft, bevel runners, and straight runners, and rag-irons, all arranged and operating substantially as described.

JOHN Q. ADAMS.
OLIVER R. ADAMS.

Witnesses:
F. W. VORSE,
H. R. ADAMS.